United States Patent
Álvarez Ponga et al.

(10) Patent No.: US 11,260,552 B2
(45) Date of Patent: Mar. 1, 2022

(54) DIGITALLY ASSISTED COMPENSATION OF MISALIGNMENTS IN DIE CUTTING OF CARDBOARD

(71) Applicants: FUNDACIÓN CENTRO DE TECNOLGÍAS DE INTERACCIÓN VISUAL Y COMUNICACIONES VICOMTECH, Donostia-San Sebastian (ES); CARTONAJES IGAMO SA, Legutio (ES)

(72) Inventors: Hugo Álvarez Ponga, Donostia-San Sebastian (ES); Ignacio Martín García, Donostia-San Sebastian (ES); Antonio Gordillo Hidalgo, Legutio (ES)

(73) Assignees: FUNDACION CENTRO DE TECNOLOGIAS DE INTERACCION VISUAL Y COMUNICACIONES VICOMTECH, Donostia (ES); CARTONAJES IGAMO SA, Legutio (ES)

( * ) Notice: Subject to any disclaimer, the term of this patent is extended or adjusted under 35 U.S.C. 154(b) by 427 days.

(21) Appl. No.: 16/474,464

(22) PCT Filed: Dec. 20, 2017

(86) PCT No.: PCT/EP2017/083907
§ 371 (c)(1),
(2) Date: Jun. 27, 2019

(87) PCT Pub. No.: WO2018/122075
PCT Pub. Date: Jul. 5, 2018

(65) Prior Publication Data
US 2019/0337177 A1    Nov. 7, 2019

(30) Foreign Application Priority Data
Dec. 28, 2016 (EP) ..................... 16382659

(51) Int. Cl.
*G06F 19/00* (2018.01)
*B26D 5/00* (2006.01)
(Continued)

(52) U.S. Cl.
CPC ................ *B26D 5/007* (2013.01); *B26F 1/44* (2013.01); *G05B 19/404* (2013.01); *B26F 2001/4409* (2013.01); *G05B 2219/50085* (2013.01)

(58) Field of Classification Search
CPC .... B26D 5/007; B26F 1/44; B26F 2001/4409; B26F 2001/4463; G05B 19/404; G05B 2219/50085
See application file for complete search history.

(56) References Cited

U.S. PATENT DOCUMENTS

2005/0061168 A1* 3/2005 Corcoran ............... B26F 1/40
                                                        100/219
2008/0196474 A1* 8/2008 Di Stefano ........ G01R 31/2891
                                                        73/1.01
(Continued)

FOREIGN PATENT DOCUMENTS

DE      102012017636      11/2013

OTHER PUBLICATIONS

European Patent Office, PCT International Search Report and Written Opinion of the Searching Authority, dated Feb. 6, 2018, 12 pages.

*Primary Examiner* — Zhipeng Wang (57) ABSTRACT

A system and a method for compensating misalignments of a die for cutting cardboard of a die cutter. The system comprises a processor configured to detect height-correcting elements in an image of a correction template for the die, and further configured to produce a digital file comprising a digital representation of detected height-correcting elements; and an optical device for projecting images config- (Continued)

ured to project the digital representation of the digital file on a pressure compensation plate of the die cutter. The method comprises digitally detecting height-correcting elements in an image of a correction template for the die; producing a digital representation of detected height-correcting elements; and projecting the digital representation on a pressure compensation plate of the die cutter.

15 Claims, 5 Drawing Sheets

(51) Int. Cl.
*B26F 1/44* (2006.01)
*G05B 19/404* (2006.01)

(56) References Cited

U.S. PATENT DOCUMENTS

| | | | |
|---|---|---|---|
| 2009/0025447 A1* | 1/2009 | Op De Hipt | B21D 28/16 72/204 |
| 2011/0252933 A1 | 10/2011 | Talkington | |
| 2015/0298341 A1* | 10/2015 | Vossen | B26F 1/44 83/686 |

* cited by examiner

DIGITALLY ASSISTED COMPENSATION OF MISALIGNMENTS IN DIE CUTTING OF CARDBOARD

TECHNICAL FIELD

The present invention relates to the field of die cutting, particularly die cutting of cardboard. More specifically, the present invention is aimed at digitally assisting in the compensation of misalignments in a die cutting process thereby easing and increasing the efficiency of the task of an operator of compensating the misalignments.

STATE OF THE ART

Companies that manufacture items and objects tend to streamline their manufacturing processes in order to maximize the efficiency thereof, thereby maximizing their revenues.

During the manufacturing of many items and objects, one or more elements thereof may be subject to a die cutting process. Die cutting refers to the use of a die for, for example, shearing, stamping, bending, and/or perforating an element. Generally, the die is mechanically coupled to a press, whereas the element to be processed is held on a workspace of the die cutter that includes a matrix for forming openings, recesses and/or protruded portions in the element; the workspace is generally a plate-shaped metallic part. When the die is pressed against the element to be processed, it physically contacts the element and, depending on the surface holding the element, particularly the matrix provided therein, the element is stamped, sheared, bended and/or perforated according to the shape of the die.

When the shape to be applied to the element has an area smaller than that of the entire die, the die then may have included therein the shape more than once. In this way several items featuring the shape in the die (i.e. one of the shapes included in the die) may be produced at once, thereby improving the efficiency.

A further advantage of die cutting is that it may carry out the processes in a precise manner: the shape provided on the die is applied to the element to be processed, therefore the shape may be replicated in the element.

However, the force exerted by the press may gradually become not uniform, thus the die contacts the element to be processed with an uneven pressure, that is, the pressure throughout the contacting surface of the die varies. In this case, the element is incorrectly processed since the non-uniform pressure distribution results in non-uniform shearing, stamping, bending and/or perforating throughout the surface of the element, and hence the element may become useless for its purpose or its quality may not meet the minimum quality requirements defined.

This problem may be solved by compensating the uneven pressure distribution with a variable height modification, generally by adding a pressure compensation plate on which the workspace with the matrix may be supported. By adjusting the way in which the die comes into contact with the element (which depends on the matrix below) the pressure distribution may be evened, namely, made more uniform. Accordingly, a correction template having a sheet of paper or plastic with several height-correcting tapes provided throughout the surface thereof may compensate the misalignments in the die cutting process; the correction template is provided on the pressure compensation plate. In some cases, the pressure compensation plate may be attached to the die so as to provide a similar compensation.

The height-correcting tapes must be carefully selected and placed on the sheet of paper or plastic since they compensate the particular unevenness of the combination of the press and the die. This means that for each press and die, a different tape layout (also referred to as correction template within the present disclosure) shall be provided as what matters is how the shape is actually applied to the element to be processed, otherwise the compensation is ineffective. And as the press is operated, the pressure distribution varies. Therefore, from time to time, the tape layout has to be modified in order to account for the gradually changing pressure distribution, even for a same combination of press and die.

Nowadays, providing these height-correcting tapes is done manually (i.e. an operator must stick the tapes to a sheet). A sheet of paper or plastic (usually semi-transparent or transparent) has printed thereon lines that depict the geometry of the items that shall be manufactured. Each of these lines indicates the position where a die cutting process shall be applied to the cardboard and, therefore, the places where the tapes must be placed. The operator must first put the sheet on the pressure compensation plate. This sheet may include the tapes used last time to manufacture the same item. The operator may then start the manufacturing process. Initially, items are first manufactured so as to adjust the correction template by placing the tapes on the right positions over the sheet until the items are correctly manufactured. The adjusting process is mainly based on the experience of the operator. When the adjusting process is ended, the operator may then launch the process in series production.

The whole process of compensating the misalignments is both time-consuming and prone to errors. Accordingly, there is an interest in simplifying the process of providing height-correcting tapes for compensating misalignments of a die while the probability of sticking the tapes not correctly may at the same time be reduced.

DESCRIPTION OF THE INVENTION

A first aspect of the invention relates to a system for compensating misalignments of a die for cutting cardboard of a die cutter, comprising: a processor configured to detect height-correcting elements in an image of a correction template for the die, and further configured to produce a digital file comprising a digital representation of detected height-correcting elements; and an optical device for projecting images configured to project the digital representation of the digital file on a pressure compensation plate of the die cutter.

The system digitally assists in the task of compensating misalignments in the die, that is, the task of compensating the non-uniform pressure applied by the die and the press coupled thereto. The system does not stick or adhere height-correcting tapes for compensating the misalignments, accordingly an operator must still carry out this task, but the operator may do so with the assistance of the system that projects a digital representation of the correction template.

The image of the correction template processed by the processor may be an image produced by a processor (e.g. digitally created from scratch in a computer) or produced by an optical device for capturing images (e.g. a photo taken by a camera).

The height-correcting elements of the image are polygonal elements indicating that a height correction must be provided in order to compensate an uneven pressure distribution of the die (that is, they indicate that a height-correcting tape shall be provided). The processor is provided with software for detecting the height-correcting elements in the image. For instance, the processor may be configured to perform image processing such as contour detection and color identification, which are known techniques in the art of image processing. In this case, the pattern of the contour (line, curve, etc.) may be first configured depending on the shape to be applied to the element. Similarly, the colors to be identified may be first configured depending on the colors that are used to represent each element. The type and size of the kernels and the thresholds used to control the contour detection and color identification may be first configured depending on the size and/or resolution of the images. An operator may test several kernels in order to find one or more kernels that provide an accurate detection of the height-correcting elements. Other image processing techniques may also be possible for detecting the height-correcting elements.

The processor produces a digital file, for example in the form of an image file that represents the detected height-correcting elements; the digital file may also be a text or a binary file where representation data is included (e.g. relationship between a height-correcting element and its position relative to the whole processed image).

An optical device for projecting images (also referred to as projector within the present disclosure) may then project the digital representation of the digital file on the pressure compensation plate of the die cutter as a visual image; the visual image is projected as projection mapping, that is, it is projected such that it adapts to the surface of the pressure compensation plate. The projection pattern that is used to deform the image and adapt it to the surface of the pressure compensation plate may be first configured depending on the shape of the pressure compensation plate (planar, curved, etc.).

The projector may be held by a support structure or platform that may be movable (automatically or manually) or static; alternatively, the projector may be fixed to a wall or a ceiling, for example. The processor may be part of a computer (e.g. laptop, desktop computer, etc.), but it is clear that it may also be part of a microcontroller or another programmable device with a processing unit therein; the processor may be remote from the die cutter, in which case it may be operated remotely, or in the vicinity of the die cutter.

The visual image projected by the projector may be adjusted in size, angle and perspective: the projector generally includes means for adjusting any of these parameters so as to project images in different sizes and in focus (not blurry) at different distances.

When the digital file is a text file or a binary file, the processor may produce a further digital file on-the-fly that is an image file with a digital representation of the height-correcting elements as logged in the text/binary file.

An operator may stick height-correcting tapes on the pressure compensation plate while being digitally assisted by the system owing to the image projection on the pressure compensation plate, therefore the layout with the height-correcting elements representing height-correcting tapes is directly casted and no sheet of paper or plastic is necessary for guiding the operator in sticking the tapes. Further, since the image may be projected during the whole process, the pressure distribution compensation may be less prone to errors. Additionally, it is not necessary to provide sheets (of paper or plastic for example) that must be printed with the layout anymore, and thus the material thereof may be saved, thereby resulting in further cost reduction.

In preferred embodiments of the invention, the system further comprises an optical device for capturing images configured to capture the image of the correction template for the die. The image of the correction template captured by the optical device for capturing images is the one on which the processor detects height-correcting elements.

The optical device for capturing images (also referred to as camera within the present disclosure) may take an image (such as a digital photograph) of the correction template when the correction template is provided on a pressure compensation plate of the die.

An operator prepares the correction template according to his/her experience and puts it on the pressure compensation plate of the die cutter so that the camera may capture it in the form of an image. The correction template includes a plurality of height-correcting tapes adhered (the tapes are generally adhesive tapes) to a sheet that is placed on the pressure compensation plate of the die cutter. Accordingly, in these preferred embodiments, the height-correcting elements are height-correcting tapes; the camera takes a photo of a correction template with height-correcting tapes, and the processor detects the height-correcting tapes in the image of the correction template for the die. In this regard, the type and size of the kernels and the thresholds used to control the contour detection and color identification may be configured depending on the size and/or resolution of the images provided by the camera, the distance of the camera to the pressure compensation plate, the illumination conditions, etc.

The correction template provided by the operator is preferably aligned with the workspace (which includes a matrix for the die) and the die once the pressure compensation plate is positioned for die cutting. The workspace may include a plate with a matrix against which the die is pressed.

The camera may be held by a support structure or platform (which, in some embodiments, may be the same support structure or platform holding the projector), which may be movable (automatically or manually) or static, or be fixed to a wall or a ceiling, for example. Once the camera captures an image of the correction template, a digital image file is produced and transmitted to the processor.

The camera may capture an image of the pressure compensation plate and identify some known reference points on it. Thus, the processor may calculate the transformation that moves these points to their canonical positions so that any image captured by the camera may be correctly processed.

Further, the projector must be calibrated with respect to the camera so as to project the digital content correctly in the desired location. In this case, the calibration is performed by projecting some calibration patterns (for example, chessboards with known dimensions) on the compensation plate, which are detected in the image captured by the camera. Thus, the calibration is solved by calculating the transformation that moves chessboard corners from the image of the camera to the projected location. This is a technique known in the art of camera-projector calibration. Other calibration techniques may also be possible for calibrating the camera with respect to the projector (or vice versa, since the problem is analogous).

In preferred embodiments of the invention, the processor is further configured to detect positions, sizes and types of the height-correcting elements in the image; and the digital representation of the detected height-correcting elements comprises the position, the size and the type of each height-correcting element.

The processor may pinpoint the location of the vertices of each height-correcting element thereby determining the position and size of each element. In this regard, the processor traverses all the contours extracted using the contour detection technique and looks for sudden changes in direction or color to identify where each height-correcting element starts and ends. The size may be determined either by identifying the area occupied by a tape or by identifying all the vertices of a tape.

Further, since the height-correcting elements are generally color-coded (for example, the height-correcting tapes may include a colored surface) for a straightforward identification of their type (that is, their thickness or, equivalently, the height correction they produce), if the correction template is formed with the appropriate height-correcting elements, namely the elements are provided not only for defining the layout but also for defining the specific height correction, the processor may also determine the type of each height-correcting element by determining its color so that the type may also be included in the digital representation (in the form of color). Therefore, the processor includes the color associated with each detected height-correcting element in the digital file, and the digital representation may include this additional information for it to be projected. The color information may be projected directly as a color, or with a character or a code that may be identified by the operator. The operator may thus stick height-correcting tapes on the pressure compensation plate using only the representation visually projected.

It is clear that other image processing techniques may also be possible for detecting the position, size and type of each height-correcting element.

In some embodiments of the invention, the processor is further configured to adjust at least one parameter of the digital representation, the at least one parameter being: a scale, an orientation, a perspective, and a combination thereof.

The processor may rescale, reorient, and/or reshape the digital representation that is supplied to the projector for its projection. Since the lens of the projector may not be in the same position as the lens of the camera, and/or the image captured by the camera is skewed or deformed due to how the lens captures the light rays, when the digital representation is projected on the pressure compensation plate it may not be aligned with the die, or may also be skewed or out of proportion. Accordingly, the processor performs image processing that attempts to correct any image alterations that would otherwise produce an incorrectly projected correction template.

It may be determined which parameter or parameters shall be modified and how much, for example, by projecting a digital representation on a pressure compensation plate while having the correction template present on the same pressure compensation plate (the one captured by the camera). As such, the digital representation may be adjusted until the projection coincides with the correction template. The operations performed to the digital representation in order to achieve this effect may then be applied to any further captured images.

In some of these embodiments, the optical device for capturing images is further configured to capture an image of the pressure compensation plate; the processor is further configured to process the image of the pressure compensation plate; and adjusting the at least one parameter of the digital representation is based on the processed image of the pressure compensation plate.

Since the projector or the camera may be moved with respect to the pressure compensation plate and/or the die itself, for instance because the support structure or platform moves, or because they are moved or reoriented by mistake, it may happen that a digital representation is projected but not aligned with the die for cutting cardboard. The camera may capture an image of the pressure compensation plate, compare it with a reference image of the pressure compensation plate (for example, an image captured when a digital file with the digital representation was produced; the comparison may entail identifying several known reference points on the image), and detect a variation in position (e.g. by using the reference points, detect the displacement between the current position and the position from which the image of the correction template was taken). The processor may determine how the digital representations must be modified (that is, which parameters and in which way) in order to account for this variation in position. These modifications may be carried out in addition to other modifications that may have been determined previously.

In preferred embodiments of the invention, the system further comprises a data storage device configured to store the digital file.

The processor produces the digital file and stores it in the data storage device so that it may be retrieved at some other time for its use or projection. Since a plurality of digital files may be stored therein, a plurality of digital representations may be readily available without requiring a storage area or a warehouse for keeping all the layouts (in the form of sheets of paper or plastic) that were used in the prior-art. Further, the problems derived from storing of layouts are also avoided, for example the layouts getting damaged, or the time it takes to properly store and retrieve each layout later.

Preferably, the data storage device comprises a database. A database may keep track of the digital files stored so that a user may find a particular digital file by running a search query.

In some embodiments, the processor is further configured to estimate wear of the die and a press coupled thereto based on a plurality of digital files stored in the data storage device.

The processor may retrieve a plurality of digital files and estimate the wear of the die and the press by analyzing the temporal evolution of the height-correcting tapes used and running data mining algorithms. By analyzing how the position and the type of each height-correcting element evolve for each die cutter it is possible to identify anomalies. For example, if a single die cutter presents many new tapes in an area of the pressure compensation plate that was previously clean compared to the rest of the die cutters, it will be used as an indicator of wear of that die cutter.

The estimated wear may assist in modifying the correction templates so that they account for possible misalignments of the die that should be compensated.

Further, in some of these embodiments, the data storage device is further configured to store the digital file with data identifying: the die for cutting cardboard, a press coupled to the die for cutting cardboard, and optionally a pressure configuration of the press.

The system may be operable with more than a single die for cutting cardboard and/or press coupled to the die. For example, a same processor may produce digital files for a same system while the system successively assists in the pressure distribution compensation of two or more dies for cutting cardboard. In this sense, the camera and the projector may be movable between at least two positions, each of these positions being aligned with one die.

So the digital files produced may be stored in the data storage device together with data that identifies the die and press for which each digital file is valid. The pressure configuration used may also be stored for adjusting the operation of the press or for monitoring purposes.

In some embodiments of the invention, the system further comprises the die cutter. The die cutter comprises both the die for cutting cardboard and the pressure compensation plate. A second aspect of the invention relates to a method for compensating misalignments of a die for cutting cardboard of a die cutter, the method comprising: digitally detecting height-correcting elements in an image of a correction template for the die; producing a digital representation of detected height-correcting elements; and projecting the digital representation on a pressure compensation plate of the die cutter.

The method digitally assists in the compensation of misalignments with the digital representation projection mapping of a correction template. An operator may be guided by the projection mapping while he/she sticks height-correcting tapes for compensating the misalignments of the die.

In some preferred embodiments, the method further comprises capturing the image of the correction template for the die; and wherein the height-correcting elements are height-correcting tapes.

In some embodiments, the method further comprises digitally detecting positions, sizes and types of the height-correcting elements in the image; and wherein the digital representation comprises the position, the size and the type of each detected height-correcting element.

In some embodiments, the method further comprises adjusting at least one parameter of the digital representation; and wherein the at least one parameter is: a scale, an orientation, a perspective, and a combination thereof.

In some of these embodiments, the method further comprises capturing an image of the pressure compensation plate; and digitally processing the image of the pressure compensation plate; and wherein adjusting the at least one parameter of the digital representation is based on the processed image of the pressure compensation plate.

In some embodiments of the invention, the method further comprises digitally storing in a data storage device a digital file comprising the digital representation of the detected height-correcting tapes; and wherein the data storage device preferably comprises a database.

When the digital representation is produced, a digital file comprising said digital representation is produced as well. Therefore, the digital file may be stored for a later use or projection thereof.

In some of these embodiments, the method further comprises digitally estimating wear of the die and a press coupled thereto based on a plurality of digital files stored in the data storage device.

Similar advantages to those described above for the first aspect of the invention are also applicable to the second aspect of the invention.

BRIEF DESCRIPTION OF THE DRAWINGS

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures.

DESCRIPTION OF A WAY OF CARRYING OUT THE INVENTION

Figure 1A:
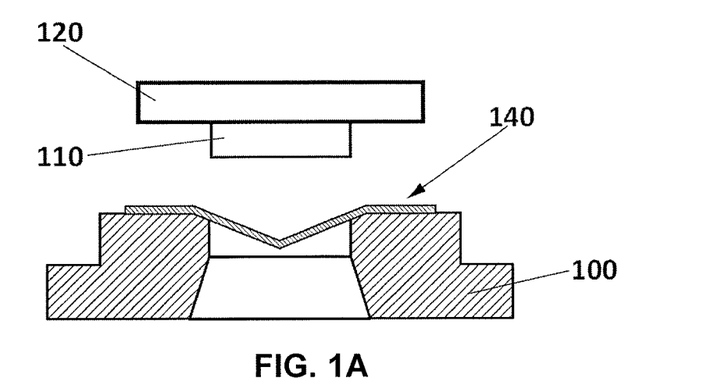
FIG. 1A is a partial representation of a die cutter for die cutting of cardboard.

FIG. 1A shows part of die cutter for die cutting of cardboard. The die cutter has a workspace (not illustrated) with a matrix 100. The die cutter includes a die 110 coupled to a press 120. The press 120 presses the die 110 against the workspace with the matrix 100, and since a cardboard element 140 is placed on top of the workspace 100, the element 140 may be sheared, stamped, bending, and/or perforated.

Ideally, the press 120 applies a uniform pressure to the die 110 so that any shapes formed on the die 110 are properly applied to the element 140, however generally the pressure distribution varies throughout the entire surface of the die 110 as the press 120 is operated.

Figure 1B:
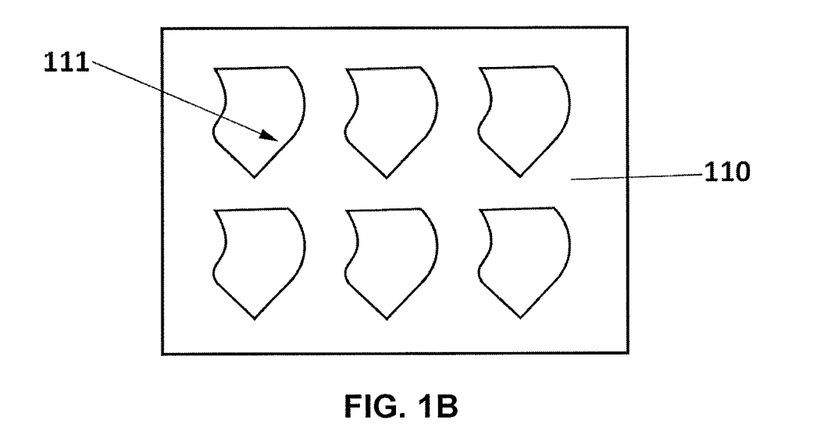
FIG. 1B shows a die for the die cutter of FIG. 1A.

FIG. 1B shows in 2D some shapes 111 formed on the die 110. Since the shapes 111 have a size smaller than the overall surface of the die 110, the shapes 111 are repeated several times throughout the surface. It is clear that the surface may feature different shapes 111 and it is not necessary that the same shape 111 is provided thereon, but it may be convenient to repeat the same shape if the device is to be used in an assembly line, for example.

Figure 1C:
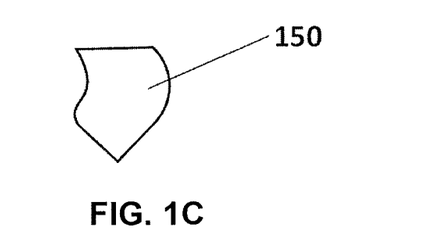
FIG. 1C shows a cardboard element after being subject to a die cutting process.

When the die 110 is pressed against the workspace 100, the cardboard element 140 is, for example, cut in several smaller elements 150 as shown in FIG. 1C, each of these elements featuring the shape 111.

Figure 2A:
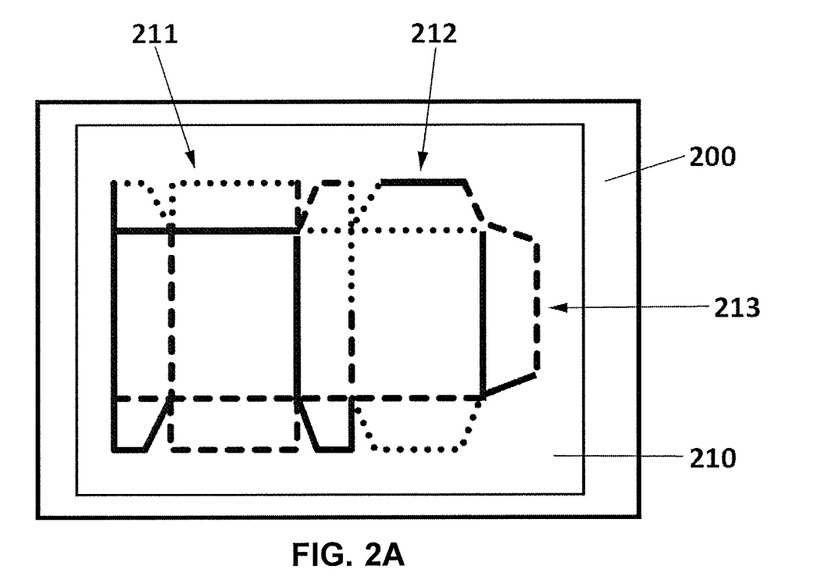
FIG. 2A shows a pressure compensation plate of a die cutter with a correction template.

FIG. 2A shows a correction template 210 for compensating misalignments of a die. The correction template 210 is provided on a pressure compensation plate 200 of a die for cutting cardboard. The correction template 210 includes a sheet of paper or plastic and a plurality of height-correcting tapes 211-213 provided thereon.

For illustrative purposes only, the height-correcting tapes 211-213 are represented with dotted lines (tapes 211), solid lines (tapes 212) and dashed lines (tapes 213) even though they are continuous tapes. Generally, each of these tapes 211-213 is color-coded, that is, at least one of its faces has a colored material for straightforward identification of the thickness the tape features or, in other words, the height it compensates or corrects. By way of example, the dotted-line tapes 211 may provide a height correction of 0.03 millimeters, the solid-line tapes 212 may provide a height correction of 0.05 millimeters, and the dashed-line tapes 213 may provide a height correction of 0.08 millimeters.

An operator arranges the tapes 211-213 so as to compensate the non-uniform pressure distribution of a press coupled to a die featuring the shape illustrated as correction template 210. Based on the product resulting from the die cutting process, the operator adjusts the height correction by adjusting the position of the tapes 211-213 and replacing them with the ones featuring the necessary height correction.

Figure 2B:
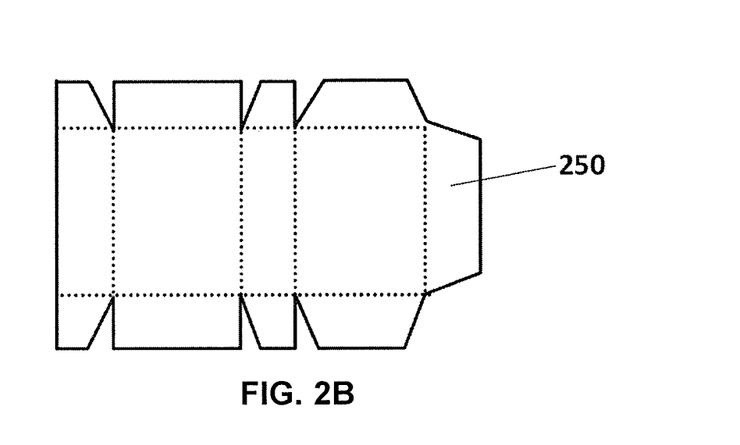
FIG. 2B shows a cardboard element resulting from a die cutting process.

FIG. 2B shows the resulting product 250 of a die cutting process when the operator has properly arranged the correction template 210. The resulting product 250 features a contour with sharp edges and several creases (shown with dotted line for illustrative purposes only). Therefore, in this example, a user may now bend the cardboard element 250 so as to form a box.

Figure 3A:
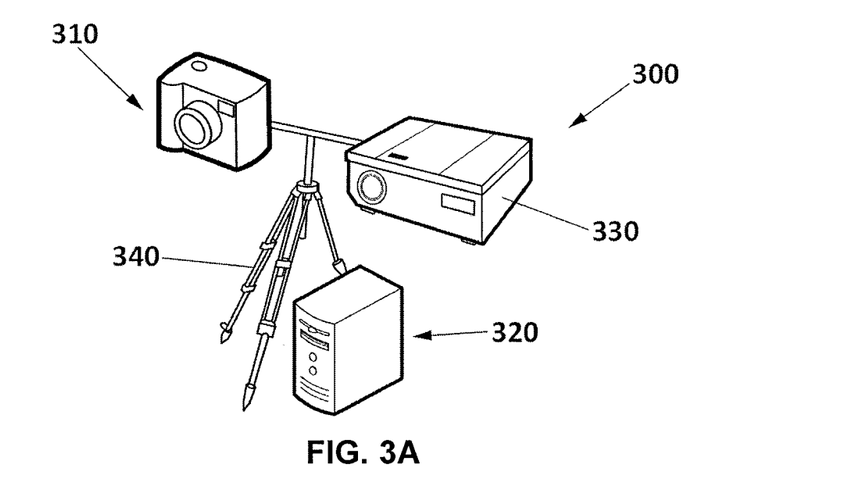
FIGS. 3A and 3B show systems in accordance with two embodiments of the invention.

FIG. 3A shows a system 300 in accordance with an embodiment of the invention. The system 300 includes an optical device 310 for capturing images, in this example a digital camera 310, a personal computer 320 that includes a processor, and an optical device 330 for projecting images, in this example a projector 330.

The digital camera 310 and the projector 330 are attached to a support structure 340 of the system 300 such that they are kept fixed one relative to the other even if the support structure 340 is moved.

Figure 3B:
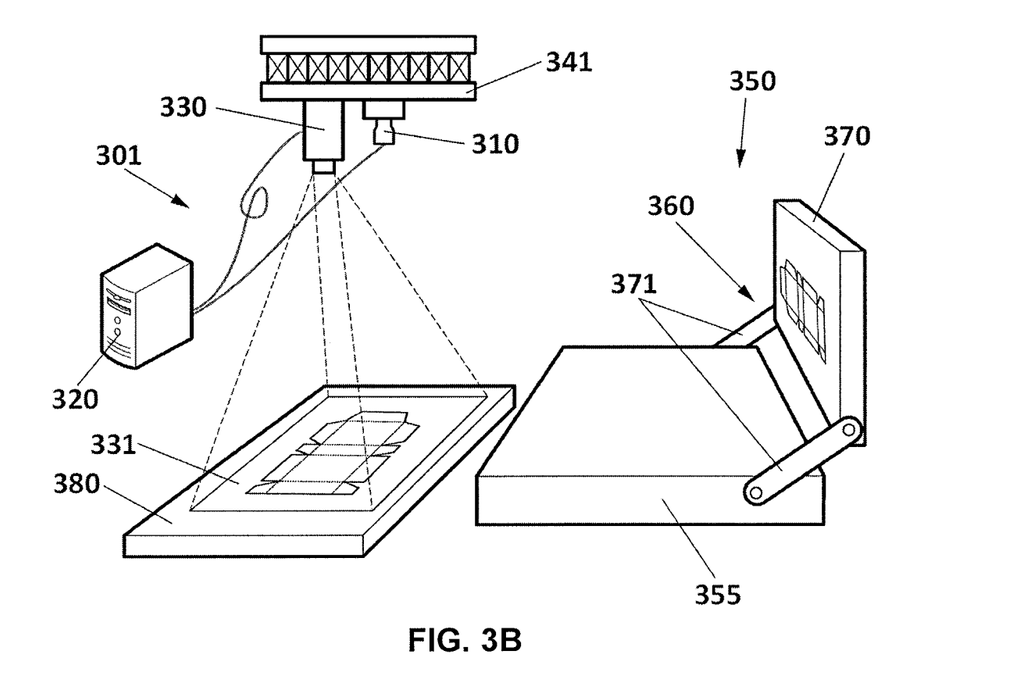

FIG. 3B shows a system 301 in accordance with another embodiment of the invention. The system includes the digital camera 310, the projector 330, and the personal computer 320 connected with cables to the digital camera 310 and the projector 330. The digital camera 310 and the projector 330 are secured to a support platform 341 that may be coupled to a ceiling for example. The support platform 341 may include a moving part that permits the camera 310 and projector 330 to move while being linked to the support platform 341.

Further, in FIG. 3B there is also shown a die cutter 350 for cutting cardboard. Particularly, the die cutter 350 comprises a plate-like workspace 355 (the matrix is not illustrated), a die 360 for cutting cardboard coupled to a press 370, moving parts 371 which permit the press 370 to press the die 360 against the workspace 355, and a pressure compensation plate 380. The pressure compensation plate 380 may be placed below the workspace 355 manually or with mechanically moving means (not illustrated).

The camera 310 has first captured an image of the correction template 210. The processor of the computer 320 processes the image and detects the height-correcting elements shown in the image, that is, the processor of the computer 320 detects the height-correcting tapes in the image. The processor then produces a digital file with a digital representation of the correction template 210 that results from the detection of height-correcting tapes of the image. In some embodiments, the digital file is stored in a data storage device (e.g. a hard disk drive or a solid-state drive of the computer 320 or of another computer, a flash memory, or a database that may be provided by a computer such as a server). The processor provides the digital representation to the projector 330, which in turn projects a visual image 331 corresponding to the digital representation of the correction template 210. While the visual image 331 is being projected on the pressure compensation plate 380, an operator may provide height-correcting tapes on the pressure compensation plate 380 so as to compensate the non-uniform pressure distribution that the press 370 applies to the die 360. It is readily apparent that even though the pressure compensation plate 380 on which the correction template is to be provided has been represented as to be placed below the workspace 355, alternatively it may also be placed between the die 360 and the press 370.

Figure 4A:
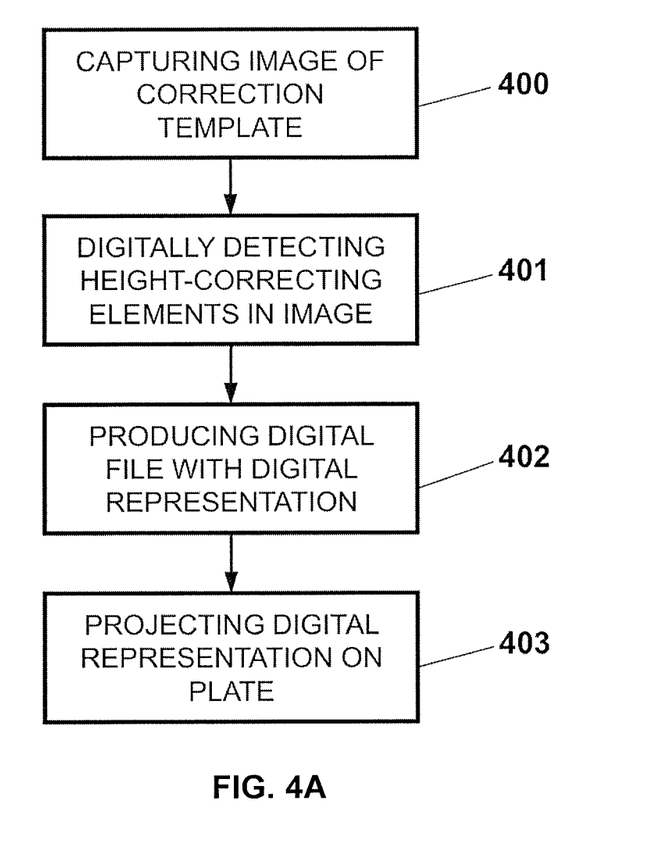
FIGS. 4A and 4B depict methods in accordance with two embodiments of the invention.

FIG. 4A illustrates, with a block diagram, a method in accordance with an embodiment of the invention. An image of a correction template (for example the correction template 210 that was provided on the pressure compensation plate 200 by an operator) is captured 400 with an optical device for capturing images. Accordingly, the optical device produces the captured image as a digital image file.

The image file is digitally processed by a processor, and said processor digitally detects 401 height-correcting tapes present in the image. In this regard, detecting 401 such tapes may include detecting the positions, sizes and types (generally in the form of colors) of the tapes so as to accurately represent any, some or all of these features for digitally assisting an operator in the sticking of height-correcting tapes on a pressure compensation plate.

Further, the method includes a step of producing 402 a digital file with a digital representation of the detected height-correcting tapes together with the positions, sizes and types detected (if any). Therefore, this digital representation is intended to provide a digital version of a layout for a correction template.

The digital representation is then projected 403 onto a pressure compensation plate of a die cutter (for example the pressure compensation plate 380 of the die cutter 350 of FIG. 3B) so as to provide a visual guidance to an operator placing height-correcting tapes on the pressure compensation plate.

Figure 4B:
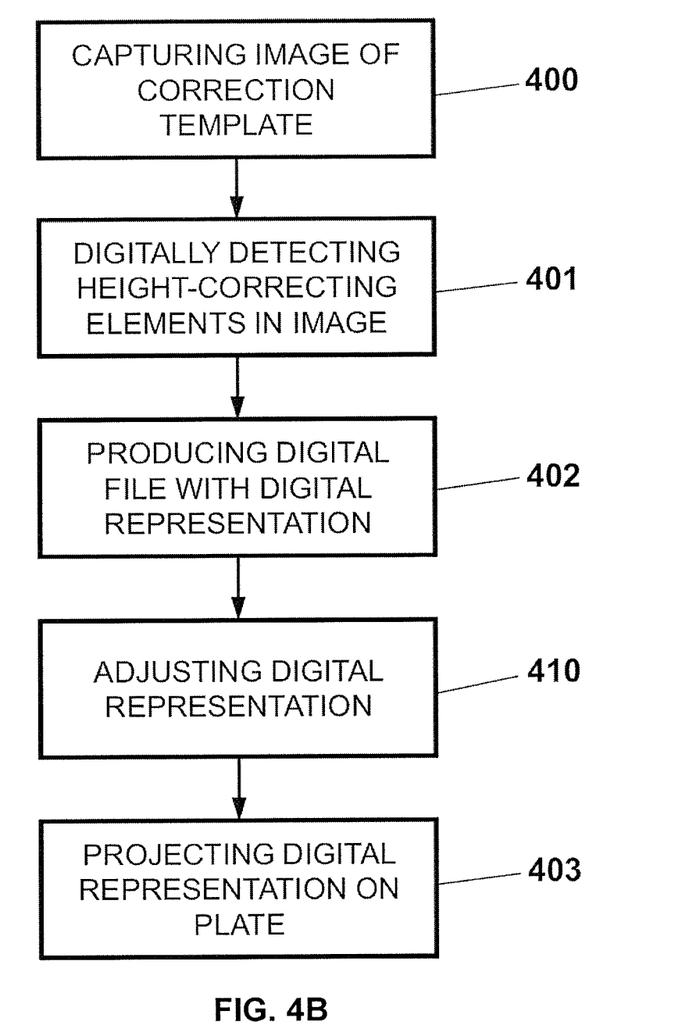

FIG. 4B depicts in a block diagram fashion a method in accordance with another embodiment of the invention. The method of FIG. 4B is similar to the method of FIG. 4A, the only difference being that after producing 402 the digital file with the digital representation, a step of adjusting 410 the digital representation takes place. By adjusting 410 the digital representation it is understood digitally modifying one or more image features (e.g. a scale, an orientation, a perspective) of the digital representation so as to align the projected correction template with the die for cutting cardboard.

In this text, the term "comprises" and its derivations (such as "comprising", etc.) should not be understood in an excluding sense, that is, these terms should not be interpreted as excluding the possibility that what is described and defined may include further elements, steps, etc.

The invention is obviously not limited to the specific embodiment(s) described herein, but also encompasses any variations that may be considered by any person skilled in the art (for example, as regards the choice of materials, dimensions, components, configuration, etc.), within the general scope of the invention as defined in the claims.

The invention claimed is:

1. A system (300, 301) for compensating misalignments of a die (360) for cutting cardboard of a die cutter (350), comprising:
   a processor configured to detect height-correcting elements (211-213) in an image of a correction template (210) for the die (360), and further configured to produce a digital file comprising a digital representation of detected height-correcting elements (211-213); and
   an optical device (330) for projecting images configured to project the digital representation of the digital file on a pressure compensation plate (380) of the die cutter (350).

2. The system (300, 301) of claim 1, wherein:
   the processor is further configured to detect positions, sizes and types of the height-correcting elements (211-213) in the image; and
   the digital representation of the detected height-correcting elements (211-213) comprises the position, the size and the type of each detected height-correcting element (211-213).

3. The system (300, 301) of claim 1, further comprising an optical device (310) for capturing images configured to capture the image of the correction template (210) for the die (360); and wherein the height-correcting elements (211-213) are height-correcting tapes (211-213).

4. The system (300, 301) of claim 1, wherein the processor is further configured to adjust at least one parameter of the digital representation, the at least one parameter being: a scale, an orientation, a perspective, and a combination thereof.

5. The system (300, 301) of claim 3, wherein:
the optical device (310) for capturing images is further configured to capture an image of the pressure compensation plate (380);
the processor is further configured to process the image of the pressure compensation plate (380); and
adjusting the at least one parameter of the digital representation is based on the processed image of the pressure compensation plate (380).

6. The system (300, 301) of claim 1, further comprising a data storage device configured to store the digital file; and wherein the data storage device preferably comprises a database.

7. The system (300, 301) of claim 6, wherein the processor is further configured to estimate wear of the die (360) and a press (370) coupled thereto based on a plurality of digital files stored in the data storage device.

8. The system (300, 301) of claim 6, wherein the data storage device is further configured to store the digital file with data identifying: the die (360) for cutting cardboard, a press (370) coupled to the die (360) for cutting cardboard, and optionally a pressure configuration of the press (370).

9. The system (300, 301) of claim 1, further comprising the die cutter (360).

10. A method for compensating misalignments of a die (360) for cutting cardboard of a die cutter (350), comprising:

digitally detecting (401) height-correcting elements (211-213) in an image of a correction template (210) for the die (360);
producing (402) a digital representation of detected height-correcting elements (211-213); and
projecting (403) the digital representation on a pressure compensation plate (380) of the die cutter (350).

11. The method of claim 10, further comprising capturing (400) the image of the correction template (210) for the die (360); and wherein the height-correcting elements (211-213) are height-correcting tapes (211-213).

12. The method of claim 10, further comprising digitally detecting positions, sizes and types of the height-correcting elements (211-213) in the image; and wherein the digital representation comprises the position, the size and the type of each detected height-correcting element (211-213).

13. The method of claim 10, further comprising adjusting (410) at least one parameter of the digital representation; and wherein the at least one parameter is: a scale, an orientation, a perspective, and a combination thereof.

14. The method of claim 10, further comprising digitally storing in a data storage device a digital file comprising the digital representation of the detected height-correcting elements (211-213); and wherein the data storage device preferably comprises a database.

15. The method of claim 14, further comprising digitally estimating wear of the die (360) and a press (370) coupled thereto based on a plurality of digital files stored in the data storage device.

\* \* \* \* \*